US008725622B2

(12) United States Patent
Gujral et al.

(10) Patent No.: US 8,725,622 B2
(45) Date of Patent: May 13, 2014

(54) SYSTEM AND METHOD FOR CONDUCTING ELECTRONIC AUCTIONS WITH MULTI-PARAMETER OPTIMAL BIDDING

(75) Inventors: Virind S. Gujral, Baden, PA (US); Tim Jackovic, Mt. Lebanon, PA (US); Greg S. Anderson, Cranberry Township, PA (US); Dan V. Pedersen, Pittsburgh, PA (US); William D. Rupp, Mt. Lebanon, PA (US); Chad Adams, Coraopolis, PA (US)

(73) Assignee: Ariba, Inc., Sunnyvale, CA (US)

( * ) Notice: Subject to any disclaimer, the term of this patent is extended or adjusted under 35 U.S.C. 154(b) by 136 days.

(21) Appl. No.: 11/982,339

(22) Filed: Oct. 31, 2007

(65) Prior Publication Data

US 2008/0183614 A1    Jul. 31, 2008

Related U.S. Application Data

(63) Continuation of application No. 09/955,751, filed on Sep. 19, 2001, now abandoned, which is a continuation-in-part of application No. 09/282,157, filed on Mar. 31, 1999, now Pat. No. 7,249,085.

(51) Int. Cl.
*G06Q 40/00* (2012.01)
(52) U.S. Cl.
USPC .............................................. 705/37; 705/35
(58) Field of Classification Search
USPC .............. 705/1–50; 717/105–106; 706/10–55
See application file for complete search history.

(56) References Cited

U.S. PATENT DOCUMENTS

| 5,715,402 | A | * | 2/1998 | Popolo ........................... 705/37 |
| 5,974,398 | A | * | 10/1999 | Hanson et al. ............. 705/14.64 |
| 6,026,383 | A | * | 2/2000 | Ausubel ......................... 705/37 |
| 6,199,050 | B1 | * | 3/2001 | Alaia et al. ..................... 705/37 |
| 6,216,114 | B1 | * | 4/2001 | Alaia et al. ..................... 705/37 |
| 6,223,167 | B1 | * | 4/2001 | Alaia et al. ..................... 705/37 |
| 6,230,146 | B1 | * | 5/2001 | Alaia et al. ..................... 705/37 |
| 6,230,147 | B1 | * | 5/2001 | Alaia et al. ..................... 705/37 |
| 6,519,574 | B1 | * | 2/2003 | Wilton et al. ................... 705/35 |

(Continued)

FOREIGN PATENT DOCUMENTS

JP              08079240 A  *  3/1996

*Primary Examiner* — Gregory Johnson
(74) *Attorney, Agent, or Firm* — Van Pelt, Yi & James LLP

(57) ABSTRACT

An auction methodology wherein the auction competition among the bidders is generated by allowing each bidder to bid for non-price bid parameters (e.g., lead time, labor rate, contract length, etc.) in addition to the price of the lot on auction. Such a multi-parameter bidding provides the buyer (i.e., the auction requester) with more diverse information when selecting the winning bidder. The buyer and each bidder participating in the electronic auction may receive a real-time feedback of the bidding activity including details on bids placed for price and non-price parameters, which allows each bidder to adjust or modify one or more of its own bids (for price and non-price bid parameters) to effectively compete in the auction. The bidding software nullifies the effect of each bidder's bids for the non-price parameters on that bidder's bid for the price parameter by multiplying the value of the bid for each non-price parameter by the number zero (0) and also locks the bid values initially received for the non-price parameters to avoid affecting their values when lot price is changed during bidding. Such zero-weighting and locking helps the buyer objectively determine the optimal bid for the lot on auction.

15 Claims, 8 Drawing Sheets

(56) References Cited

U.S. PATENT DOCUMENTS

| | | | |
|---|---|---|---|
| 6,778,968 B1* | 8/2004 | Gulati | 705/36 R |
| 6,871,191 B1* | 3/2005 | Kinney et al. | 705/37 |
| 6,934,692 B1* | 8/2005 | Duncan | 705/35 |
| 6,980,963 B1* | 12/2005 | Hanzek | 705/26.62 |
| 7,010,511 B1* | 3/2006 | Kinney et al. | 705/37 |
| 7,039,609 B2* | 5/2006 | Aoki | 705/37 |
| 7,249,085 B1* | 7/2007 | Kinney et al. | 705/37 |
| 7,349,879 B2* | 3/2008 | Alsberg et al. | 705/37 |
| 7,392,215 B1* | 6/2008 | Bril | 705/37 |
| 7,624,051 B2* | 11/2009 | Gellman | 705/35 |
| 7,792,713 B1* | 9/2010 | Kinney et al. | 705/35 |
| 7,835,957 B1* | 11/2010 | Kinney, Jr. | 705/35 |
| 7,921,053 B2* | 4/2011 | Kinney et al. | 705/37 |
| 2001/0032162 A1* | 10/2001 | Alsberg et al. | 705/37 |
| 2001/0039531 A1* | 11/2001 | Aoki | 705/37 |
| 2001/0049651 A1* | 12/2001 | Selleck | 705/37 |
| 2002/0007324 A1* | 1/2002 | Centner et al. | 705/26 |
| 2002/0013631 A1* | 1/2002 | Parunak et al. | 700/28 |
| 2002/0019795 A1* | 2/2002 | Madoff et al. | 705/37 |
| 2002/0026403 A1* | 2/2002 | Tambay et al. | 705/37 |
| 2002/0042769 A1* | 4/2002 | Gujral et al. | 705/37 |
| 2002/0069156 A1* | 6/2002 | Adam et al. | 705/37 |
| 2002/0077954 A1* | 6/2002 | Slaight et al. | 705/37 |
| 2002/0103741 A1* | 8/2002 | Boies et al. | 705/37 |
| 2002/0107748 A1* | 8/2002 | Boies et al. | 705/26 |
| 2002/0156719 A1* | 10/2002 | Finebaum et al. | 705/37 |
| 2002/0174054 A1* | 11/2002 | Grey et al. | 705/37 |
| 2002/0178077 A1* | 11/2002 | Katz et al. | 705/26 |
| 2003/0041001 A1* | 2/2003 | Hoffman et al. | 705/37 |
| 2003/0041007 A1* | 2/2003 | Grey et al. | 705/37 |
| 2003/0041008 A1* | 2/2003 | Grey et al. | 705/37 |
| 2003/0041009 A1* | 2/2003 | Grey et al. | 705/37 |
| 2003/0041011 A1* | 2/2003 | Grey et al. | 705/37 |
| 2003/0041013 A1* | 2/2003 | Grey et al. | 705/37 |
| 2003/0041014 A1* | 2/2003 | Grey et al. | 705/37 |
| 2003/0055771 A1* | 3/2003 | RuDusky | 705/37 |
| 2003/0074250 A1* | 4/2003 | Burk | 705/10 |
| 2003/0083947 A1* | 5/2003 | Hoffman et al. | 705/22 |
| 2003/0097317 A1* | 5/2003 | Burk et al. | 705/30 |
| 2003/0130927 A1* | 7/2003 | Kellam et al. | 705/37 |
| 2004/0068459 A1* | 4/2004 | Goulet et al. | 705/37 |
| 2004/0230512 A1* | 11/2004 | Gulati | 705/36 |
| 2005/0144115 A1* | 6/2005 | Brett | 705/37 |
| 2005/0234811 A1* | 10/2005 | Herman et al. | 705/37 |
| 2006/0149653 A1* | 7/2006 | Davis et al. | 705/37 |
| 2007/0239596 A1* | 10/2007 | Kinney et al. | 705/37 |
| 2007/0299766 A1* | 12/2007 | Bril | 705/37 |
| 2008/0133398 A1* | 6/2008 | Kinney et al. | 705/37 |
| 2008/0183614 A1* | 7/2008 | Gujral et al. | 705/37 |

* cited by examiner

FIG. 4    AUCTION NETWORK

SYSTEM AND METHOD FOR CONDUCTING ELECTRONIC AUCTIONS WITH MULTI-PARAMETER OPTIMAL BIDDING

CROSS-REFERENCE TO RELATED APPLICATIONS

This application is a continuation of U.S. patent application Ser. No. 09/955,751, entitled SYSTEM AND METHOD FOR CONDUCTING ELECTRONIC AUCTIONS WITH MULTI-PARAMETER OPTIMAL BIDDING filed Sep. 19, 2001 which is incorporated herein by reference for all purposes, which is a continuation in part of U.S. patent application Ser. No. 09/282,157 entitled METHOD AND SYSTEM FOR CONDUCTING ELECTRONIC AUCTIONS WITH MULTI-PARAMETER PRICE EQUALIZATION BIDDING filed Mar. 31, 1999, now U.S. Pat. No. 7,249,085, which is also incorporated herein by reference for all purposes.

BACKGROUND

1. Field of the Invention

The present invention broadly relates to conducting electronic auctions, and more particularly, to a scheme where bidders can place bids for price and non-price parameters, review bids placed by other bidders, and modify earlier-placed bids-all in real time.

2. Description of Related Art

Procurement of goods and services have traditionally involved high transaction costs. The cost of finding and qualifying potential bidders has been particularly high. The advent of electronic commerce has introduced new methods of procurement that lower some of the transaction costs associated with procurement. Electronic procurement, in particular business-to-business electronic procurement, matches buyers and suppliers and facilitates transactions that take place on networked processors.

Four models of electronic procurement have been developed: catalog, buyer-bidding auctions, seller-bidding auctions, and exchange marketplaces.

The "catalog" model was an early form of online electronic procurement. Initially, electronic catalogs were developed primarily by sellers, typically suppliers, to help customers obtain information about products, and order supplies electronically. Those first electronic catalogs were single-source; i.e. they only allowed customers to obtain information and products from a specific supplier.

Although the first electronic catalogs reduced the information search cost associated with procurement, customers were disadvantageously "locked in" to one supplier at each electronic catalog. Customers were thus unable to compare a number of competing products in a single catalog. Therefore, certain suppliers with single-source catalogs began including competitors' products in their systems. The inclusion of competing products in electronic catalogs reduced procurement information search costs even further. By offering competing products, electronic catalogs became "electronic markets."

Many electronic catalogs, however, were biased toward the supplier offering the electronic catalog, and it was thought that procurement costs could be lowered further through an unbiased market. Therefore, third-party "market makers" developed markets for many standard products and services, which were intended to be unbiased markets.

Electronic commerce using the electronic catalog model typically involves one buyer and one seller at a time. When many buyers compete for the right to buy from one seller, a buyer-bidding auction model, or forward auction, is created. Catalog and buyer-bidding auction models, however, have limitations and do not work well in every situation. For example, it is difficult for a supplier to publish set prices in a catalog for custom products. Therefore, when a buyer requires a custom product, pricing for that product typically will not be found in a catalog. Likewise, it is difficult to specify a custom product and identify buyers who might use that custom product for a buyer-bidding auction. Additionally, there may be only one buyer interested in a custom product, such that a buyer-bidding auction may not be applicable in all cases. Thus, few suppliers can typically provide custom goods and services and standard product and pricing information is typically not available for buyers of custom industrial products.

Referring again to the cost of traditional procurement, and particularly procurement of custom products and services, when a company required a custom product, a buyer/purchaser for the company would typically procure the product by searching for potential suppliers and then acquire price quotes from the potential suppliers for the needed custom product. The search tended to be slow and random, and typically relied heavily on personal relationships. The costs associated with locating vendors, comparing prices, and negotiating a deal were therefore large. The cost of switching suppliers was also large, such that an incumbent supplier's quoted price was most likely not the lowest price he could offer because the incumbent supplier knew the buyer would face switching costs to use another supplier. As an additional consequence, new suppliers had a difficult time entering the market because of those high switching costs.

Therefore, supplier-bidding auctions for products and services defined by a buyer have been developed. The assignee of the present application has developed a system in which sellers downwardly bid against one another to achieve the lowest market price in a supplier-bidding auction. In such auctions, various goods or services may simultaneously be placed for auction.

Traditionally, in a supplier-bidding auction environment, the suppliers/bidders primarily place their bids for the price of the product or service to be auctioned. However, to generate auction competition among bidders, it is desirable to allow each supplier/bidder to bid for other non-price parameters (such as lead time, labor rate, contract length, etc.) as well so as to generate an optimal bid for the buyer (i.e., auction requester). In that event, it is desirable to provide each bidder real-time detailed as well as summarized reports of what other bidders are bidding for price as well as non-price parameters so as to allow the bidder to adjust or modify the bidder's latest bid record to effectively compete in the auction marketplace. However, to generate the optimal bid for the buyer, it is desirable to nullify the effect of a bidder's bids for the non-price parameters on that bidder's bid for the price parameter so as to assist the buyer objectively determine the winning bid based on the values received from the bidders for the price parameter only. It is further desirable to provide the buyer with the bidding information about the non-price parameters in real-time so as to keep the buyer abreast of the dynamically changing auction environment.

SUMMARY

In one embodiment, the present invention contemplates a method of conducting an on-line auction among a plurality of bidders, wherein each of the plurality of bidders is competing for a lot having at least one item to be auctioned by an auction requester. The method comprises allowing each bidder to place a respective bid for each of a plurality of bid parameters established for the lot, wherein the plurality of bid parameters includes a price parameter and at least one non-price parameter; and, making bids received from each bidder for the price and non-price parameters available to the auction requester in real-time. The method also includes, for each bidder, generating a total bid for the lot by combining all bids placed by that bidder, wherein the total bid equals in value to the bid for the price parameter placed by the corresponding bidder. Some examples of the non-price parameters include lead time, labor rate, contract length, etc. The total bid value is determined by nullifying the effect of bids received for non-price parameters on the value of the bid received for the price parameter from a bidder. Each bid for the non-price parameter is multiplied by zero (0) to nullify its effect on the bid for the price parameter. The zero-weighting thus helps the buyer (i.e., the auction requester) to objectively evaluate each bidder's bid based on the price of the lot without relying on subjective non-price parameters.

The auction methodology according to the present invention also includes delivery of real-time feedback of bidding activity to each bidder participating in the on-line auction so as to allow the bidder to modify that bidder's bids (for price and non-price parameters) in response to the other bidders' bids in the marketplace. This results in a downward price competition (e.g., in a reverse auction setup) that is beneficial to the buyer. A bidding software according to the present invention also collects bidding activity data and sends the data to each bidder's computer terminal where the bidder can view the competitive bidding data in a graph format. This also allows each bidder to review that bidder's bidding performance in relation to one or more other bidders in the marketplace. In one embodiment, the auction requester also receives real-time bidding history.

In one embodiment, the bidding software "locks" the bid values initially received for non-price parameters, but keeps the values received for the price parameter as "unlocked." In other words, whenever a bidder changes the value it had bid before for the lot on auction, that changed value is applied to the price parameter only. Thus, the values bid for the non-price parameter remain unchanged whenever bids are automatically changed or whenever the bidder enters a new bid value. One advantage of maintaining the non-price parameter fields as "fixed" is that it helps the buyer obtain the optimum bid on the buyer's lot on auction.

The present invention also contemplates a system that includes one or more bidder computers connected to an auction coordinator's computer via a communication network (e.g., the Internet). The buyer's or auction requester's computer is also connected to the auction coordinator's computer via the Internet or via any other computer data communication network (e.g., a LAN). The bidding software may reside on the auction coordinator's computer and may assist in conducting the one auction according to the teachings of the present invention.

Accordingly, the present invention provides solutions to the shortcomings of prior online auctions. The real-time feedback mechanism, the zero-weighting of bids received for non-price parameters, and the "locking" of bids initially received for non-price parameters assist the buyer or the auction requester to receive the bidding history in real-time in a dynamically changing auction environment and to objectively evaluate various bids to obtain the optimum bid for the buyer's lot on auction. Those of ordinary skill in the art will readily appreciate, therefore, that those and other details, features, and advantages will become further apparent in the following detailed description of the preferred embodiments.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention. In the drawings.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical auction systems and computer networks. It is noted that the present invention described below extends the operation of the inventive auction system and method described in greater detail in the co-pending U.S. patent application Ser. No. 09/252,790, titled "Method and System for Conducting Electronic Auctions," filed on Feb. 19, 1999, the disclosure of which is hereby expressly incorporated by reference in its entirety.

In a supplier-bidding auction or reverse auction, bids, which are often in the form of a price quote, typically start high and move downward over time as bidders interact to establish a closing price. Typically, the auction marketplace is one-sided, with one buyer and many potential suppliers, although multiple-buyer auctions are possible. Typically, products are purchased in the form of components or materials. "Components" may include fabricated tangible pieces or parts that become parts of assemblies of durable products. Example components include gears, bearings, and appliance shelves. "Materials" may include bulk quantities of raw materials that are further transformed into products. Example materials include corn syrup and sheet steel. Services may also be purchased in such a reverse auction.

It is noted that the terms "supplier" and "bidder" are used interchangeably herein to refer to a person or legal entity participating as a bidder in an on-line auction. Similarly, the terms "sponsor", "buyer", "purchaser" or "auction requester" are also used interchangeably herein to refer to a person or legal entity that puts up a lot (as defined hereinbelow) for auction and requests bids for the same from the suppliers or bidders.

Figure 1A:
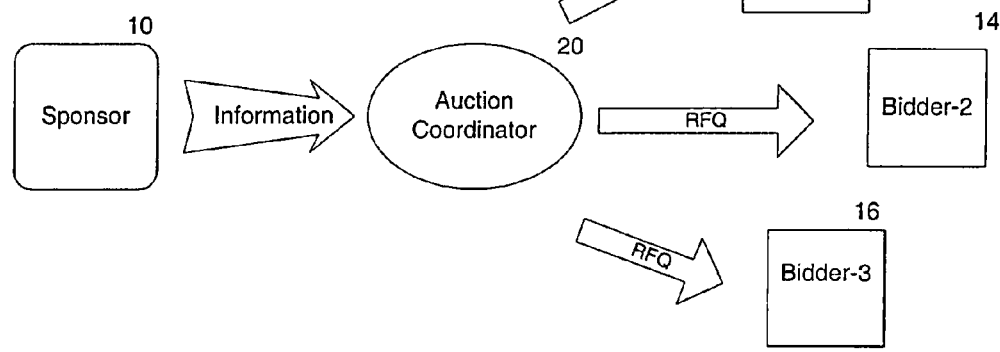
FIG. 1A is a schematic illustration of the entities involved in an embodiment of an auction wherein the sponsor identifies goods or services to be purchased in a request for quotation.
Figure 1B:
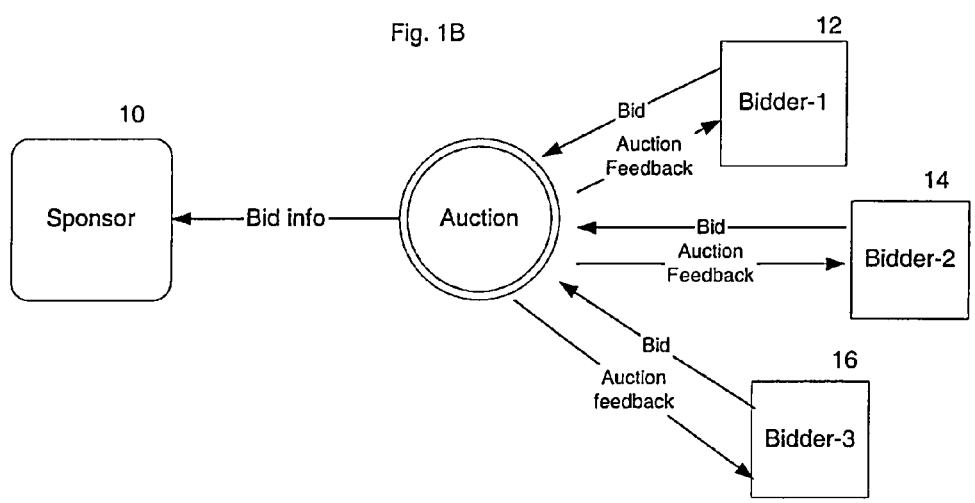
FIG. 1B is a schematic illustration of entities participating in an embodiment of an auction.
Figure 1C:
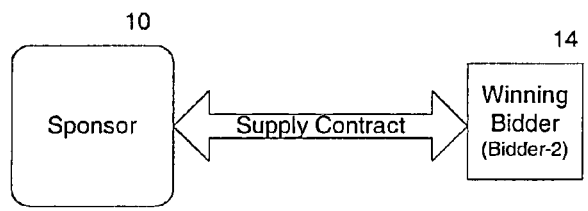
FIG. 1C is a schematic illustration of entities participating in an embodiment of a contract award following an auction.

The basic process for a purchaser sponsored supplier-bidding or reverse auction, as conducted by the assignee of the present invention, is described below with reference to FIGS. 1A-1C, which illustrate the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction. It is noted that FIGS. 1A-1C are for illustrative purpose only. In other words, even though only three bidder 12, 14, and 16 are shown in the auction process depicted in FIGS. 1A-1C, it is obvious that in an actual auction there may be more or less than three bidders participating in the auction depending on, for example, the products or services to be auctioned, the qualifications demanded of a bidder, how commercially lucrative the auction is, the reputation of the sponsor 10, etc.

Industrial buyers do not typically purchase one component at a time. Rather, they tend to purchase whole families of similar components. Therefore, in a typical industrial supplier-bidding auction, products are grouped together in "lots" of related items for bidding. In a regular lot bidding auction, each lot is composed of one or more "line items." In the regular lot bidding auction, the suppliers bid on each line item and the bidder having the best bid for all of the parts in the lot is the best bidder. The best bidder (e.g., the bidder 14 in FIG. 1C) is typically awarded a contract to supply the items in the lot. In an aggregate type lot bid, a single bid for all of the line items is submitted by each bidder 12, 14, 16 and the bidder submitting the lowest aggregate price is the best bidder. By lotting products, potential suppliers can bid on lots for which they are best suited, and are not typically required to bid on every lot. Such a division into lots beneficially reduces the barrier to entry for new potential suppliers that only have capability to supply some of the needed products in the auction. Reducing the barrier to entry also benefits the purchaser by injecting additional bidders into bidding for certain lots.

Typically, components in a lot are related to one another such that it is more efficient to have a supplier provide all of the components in that lot. As an example, a buyer might purchase a given plastic knob in two different colors, or might purchase a nameplate in four different languages. Those parts are so similar that it is nearly always more efficient to purchase those related components from the same supplier because, for example, all of the knobs may be made using with same mold. Thus, such related items are typically grouped in a single "lot." As is known by one skilled in the art, there are many additional methods of lotting products for an auction.

As will be apparent to one skilled in the art, while the invention is generally described in terms of one buyer and multiple suppliers, the present invention may also be used in other types of electronic markets, such as auctions having multiple potential buyers and sellers, forward auctions having a single seller and multiple potential purchasers, upward-bidding auctions, or electronic exchange marketplaces. As noted hereinbefore, the term "sponsor" is utilized herein to identify the party or parties that originate the auction. In a forward auction, for example, the sponsor would typically be the supplier or seller of one or more goods or services. In such a forward auction, that sponsor might state a good that it desires to sell and receive bids from parties wishing to purchase that good. Those parties wishing to purchase that good would therefore be "bidders" 12-16 in such a forward auction.

In a reverse auction example, the sponsor would typically be the purchaser or buyer of one or more goods or services. In such a reverse auction, that supplier might state a good that it desires to purchase and receive bids from parties wishing to supply that good. Those parties wishing to supply that good would furthermore be "bidders" 12-16 in such a reverse auction.

In the typical supplier-bidding reverse auction model, the product or service to be purchased is usually defined by the sponsor of the auction. As shown in the embodiment illustrated in FIG. 1A, when the sponsor 10 decides to use the auctioning system of the present invention to procure products or services, the sponsor 10 provides information to an auction coordinator 20. That information may include information about incumbent suppliers and historic prices paid for the products or services to be auctioned, for example. Typically, the sponsor 10 may also work with the auction coordinator 20 to define the products and services to be purchased in the auction and, if desired, lot the products and services appropriately so that needed products and services can be procured using optimal auction dynamics. A specification may then be prepared for each desired product or service, and a Request for Quotation ("RFQ") generated for the auction.

Next, the auction coordinator 20 typically identifies potential suppliers 12-16, preferably with input from the sponsor 10, and invites the potential suppliers 12-16 to participate in the upcoming auction. The suppliers 12-16 that are selected to participate in the auction become bidders 12-16 and may be given access to the RFQ, typically through an RFQ in a tangible form, such as on paper or in an electronic format.

As shown in FIG. 1B, during a typical auction, bids are made for lots. Bidders 12-16 may submit actual unit prices for each line item within a lot. However, the competition in an auction is typically based on the aggregate or total value bid for all line items within a lot. The aggregate value bid for a lot may, therefore, depend on the level and mix of line item bids and the quantity of goods or services that are offered for each line item. Thus, bidders submitting bids at the line item level may actually be competing on the lot level. During the auction, the sponsor 10 can typically monitor the bidding as it occurs. Bidders 12-16 may also be given market feedback during the auction so that they may bid competitively.

Feedback about bidding activity is referred to as "market feedback" and includes any information or data related to the bidders 12-16 or their bids, interrelationships between those bids, and any other bid related information or data that is received before or during the auction. Market feedback may include, for example, bids that have been placed by other bidders 12-16, the rank of a bidder in relation to that of one or more other bidders 12-16, the identity of bidders 12-16, or any subset of that information. Market feedback may also include non-pricing information such as, for example, the quality of the goods to be provided by bidders 12-16 and shipping costs associated with one or more bidders 12-16. Providing such market feedback to bidders 12-16 in an auction helps create real-time competitive interaction among participants in the auction because, without feedback, bidders 12-16 who are not leading in an auction might not be aware of their relative position and would have less incentive to revise their price quotes and place additional bids to remain competitive.

After the auction, the auction coordinator 20 may analyze the auction results with the sponsor 10. The sponsor 10 typically conducts final qualification of the low bidding supplier or suppliers. The sponsor 10 may furthermore retain the right not to award business to a low bidding supplier (e.g., the supplier 14 in FIG. 1C) based on final qualification or other business concerns. As shown in FIG. 1C, at least one supply contract is usually drawn up and executed based on the results of the auction.

The auction may be conducted electronically between bidders 12-16 at their respective remote sites and the auction coordinator 20 at its site. In an alternative embodiment, instead of the auction coordinator 20 managing the auction at its site, the sponsor 10 may itself perform the auction coordinator tasks at its site.

Figure 2:
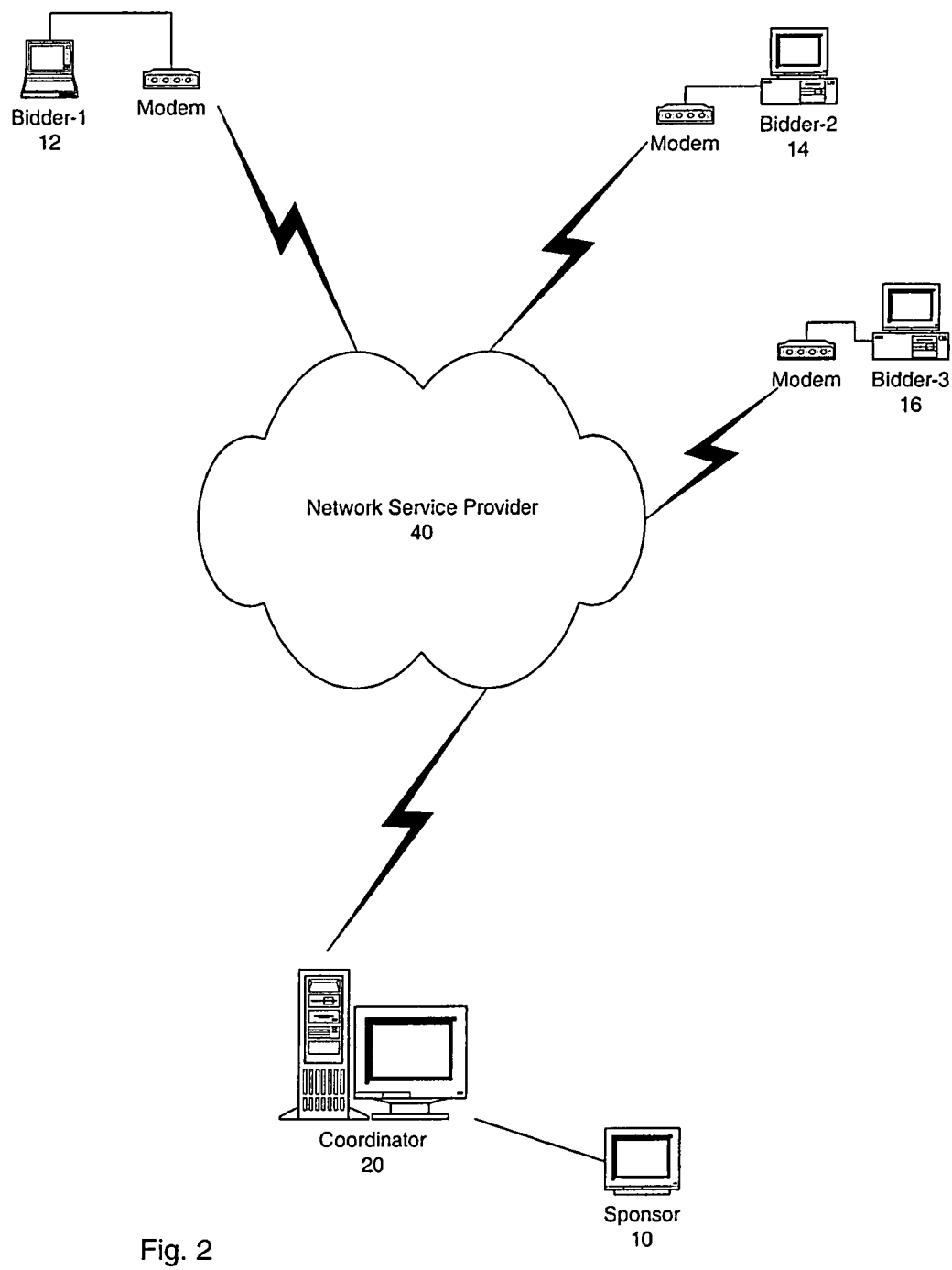
FIG. 2 is a schematic illustration of communications links between the coordinator, the buyer, and the suppliers in an embodiment of an auction.

Information may be conveyed between the coordinator 20 and the bidders 12-16 via any known communications medium. As shown in FIG. 2, bidders 12-16 may participate in the auction through the Internet via a network service provider 40 accessed, for example, through a dial-up telephone connection. Alternately, sponsors 10 and bidders 12-16 may be coupled to the auction by communicating directly with the coordinator 20 through a public switched telephone network, a wireless network (including, for example, a cellular telephone network), or any other known connection method. Other methods of connecting sponsors 10 and bidders 12-16 and other communications media are known to those skilled in the art, and are intended to be included within the scope of the present invention. For example, the sponsor computer terminal 10 may be connected to the auction coordinator's computer terminal 20 via a LAN (local area network), WAN (wide area network) or any other suitable data communication network.

Figure 3:
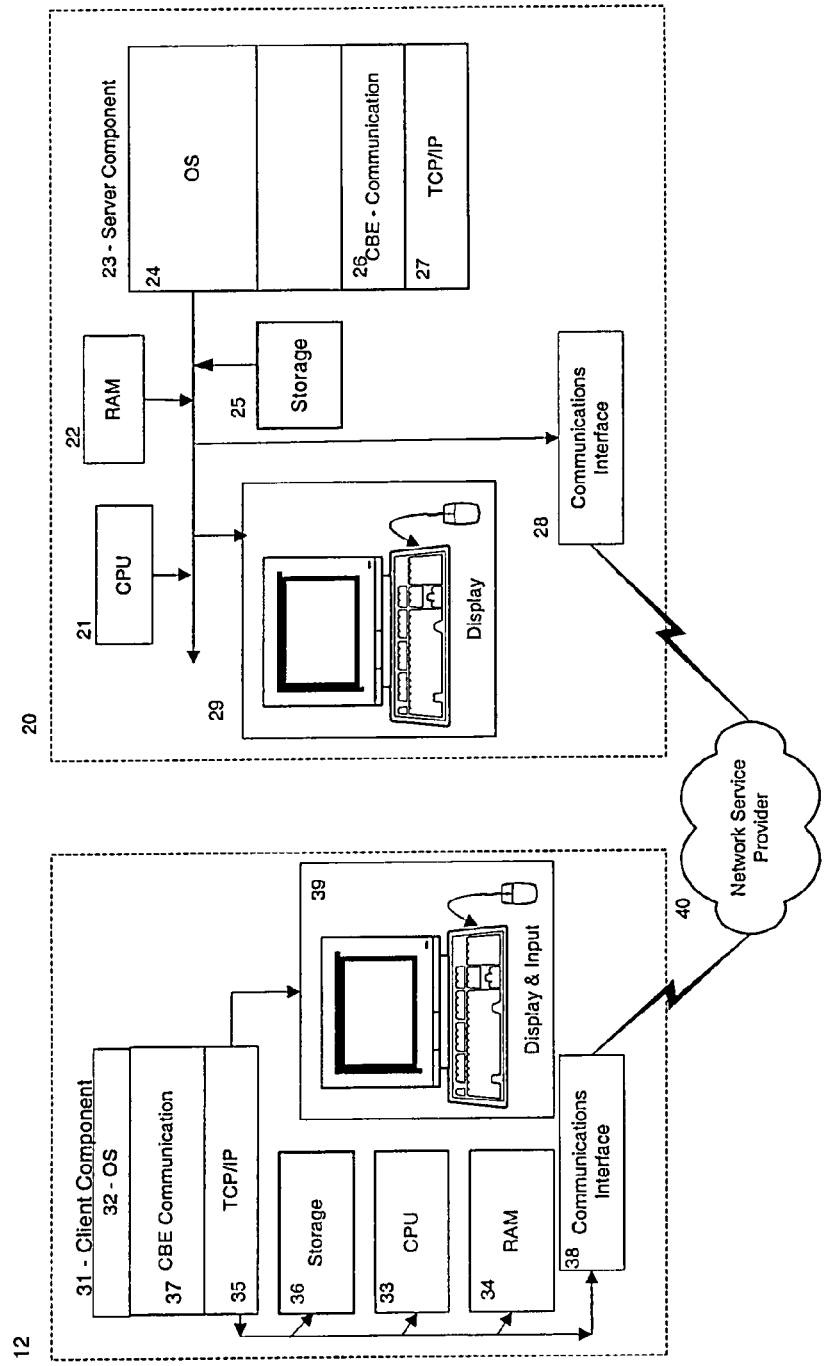
FIG. 3 is a schematic illustration of auction software and computers hosting that software in an embodiment of an auction.

Referring now to FIG. 3, a schematic illustration of auction software and computers hosting that software in an embodiment of an auction is shown. It is noted that for the sake of simplicity of illustration, FIG. 3 illustrates an exemplary data communication setup only between the auction coordinator 20 and one of the bidders 12. However, the same data communication arrangement may be easily replicated for other bidders 14,16 as is known in the art. Therefore, the discussion given hereinbelow with reference to FIG. 3 equally applies to data communication between the computer terminals for other bidders (e.g., bidders 14, 16) and the auction coordinator's computer terminal 20. Furthermore, it is noted that the same reference numeral is used herein to refer to a person or entity and its computer terminal for ease of discussion. For example, the reference numeral "20" is used in FIG. 2 to refer to the auction coordinator and in FIG. 3 to refer to the computer terminal accessible to or operated by the same auction coordinator. Similarly, the reference numeral "12" refers to the bidder-1 in FIG. 2 and also to the computer terminal accessible to or operated by bidder-1 as shown in FIG. 3.

As noted above, a computer software application may be used to manage the auction. The software application may include two components: a client component 31 and a server component 23. FIG. 3 illustrates a server component 23 and a client component 31 resident in respective host computers in one embodiment. As may be seen in FIG. 3, the server component of that embodiment includes an operating system 24, the server module of the competitive bidding event (CBE) or auction communication software 26, and the server module of the Internet protocol software 27. The server software 23 is hosted on a computer 20 having a processor 21, random access memory 22, and a data storage facility 25. The host computer 20 also includes input and output devices 29 such as, for example, a monitor, printer, mouse and keyboard, and a communications interface 28 (including, for example, a modem unit (not shown)) for communicating with the client component 31. As noted hereinbefore, the sponsor 10 may itself act as the auction coordinator 20. In that event, the sponsor's computer terminal 10 may function as the host computer 20 and include the hardware and software described hereinabove for the host computer 20.

The client component 31 of the embodiment illustrated in FIG. 3 includes an operating system 32, the client module of the competitive bidding event communication software 37, and the client module of the Internet protocol software 35. The client component software 31 is hosted on a computer 12 having a processor 33, random access memory 34, and a data storage facility 36. The host computer 12 also includes input and output devices 39 such as, for example a monitor, printer, mouse and keyboard, and a communications interface 38 (including, for example, a modem unit (not shown)) for communicating with the server component 23.

In one embodiment, the auction coordinator's computer terminal 20 is an IBM-PC type computer system operating under the Microsoft Windows® NT operating system environment. Similarly, bidder-1's computer terminal 12 is also an IBM-PC line of computer system with Windows® 2000 operating system. The Internet protocol software 27 and 35 may include respective server and client versions of the Microsoft Internet Explorer web browser software. Other web browsers, operating systems, or computer architectures may be conveniently employed as well. In one embodiment, the server and client modules (26 and 37 respectively) of the CBE communication software are written in C++ programming language.

The client component 31 is used by the bidders 12-16 to make bids during the auction, and to receive and display (on the corresponding computer monitor or display terminal) feedback from the auction. The client component may, for example, be a program that is installed on a bidder's computer, or it may be software that resides at a web site which is accessed by the bidder's computer to run/execute the client component software from that web site. In one embodiment, bids can typically only be submitted using the client component of the application, thereby ensuring that sponsors 10 cannot circumvent the bidding process, and that only invited suppliers 12-16 participate in the bidding. Each computer software application (including the client and server modules of the CBE communication software, 37 and 26 respectively) may be stored in the respective data storage device (36 and 25 respectively) and executed by the corresponding processor (33 and 21 respectively) as described in connection with FIG. 4 hereinbelow.

Bids are sent by bidders (with the help of respective client modules of the CBE communication software 37 on the bidders' computers 12-16) over a communications medium (e.g., the Internet or a combination of other wireline and wireless networks) to, for example, the auction coordinator's computer terminal 20, or, where the sponsor 10 itself is performing auction coordination tasks, directly to the sponsor's computer terminal 10. Bids are received by the server component 23. As noted before, the client component 31 includes software functions for making a connection over the communications medium to the server component 23. Bids are submitted over this connection established between a client component 31 and the server component 23 and the feedback information is sent from the server component 23 to respective client component 31 on the connected bidders' computer terminals 12-16.

When a bidder 12-16 submits a bid through the bidder's computer terminal using a data input device (e.g., a computer keyboard), that bid is first received by the client component 31 (which may be resident in the memory of the bidder's computer terminal or may be executed at a remote web site as discussed hereinbefore), which then sends the bid to the server component 23 to be evaluated to determine whether it is a valid or acceptable bid. Feedback about received bids is sent to connected bidders 12-16 as is applicable, enabling bidders 12-16 receiving feedback to see changes in market conditions and plan competitive responses.

The embodiments described herein utilize an online reverse auction as an example in which the present invention may be utilized. In the reverse auction example, suppliers 12-16 bid to supply goods or services to a purchaser 10 and the purchaser 10 typically purchases the goods or services from the lowest priced qualified bidder (e.g., the bidder 14 in FIG. 1C). It is to be understood, however, that the present invention may be used in other applications, would not necessarily have to be carried out online, and may be performed by other than a computer processor. The present invention may also be utilized in connection with auctions other than reverse auctions. For example, the present invention may be advantageously utilized with forward auctions, wherein the party offering the highest priced qualified bid, rather than the lowest priced qualified bid (as, for example, in a reverse auction), is awarded the goods or services being sold. Thus, placing a "better bid" in a reverse auction indicates placing a lower bid, while placing a "better bid" in a forward auction indicates placing a higher bid.

Figure 4:
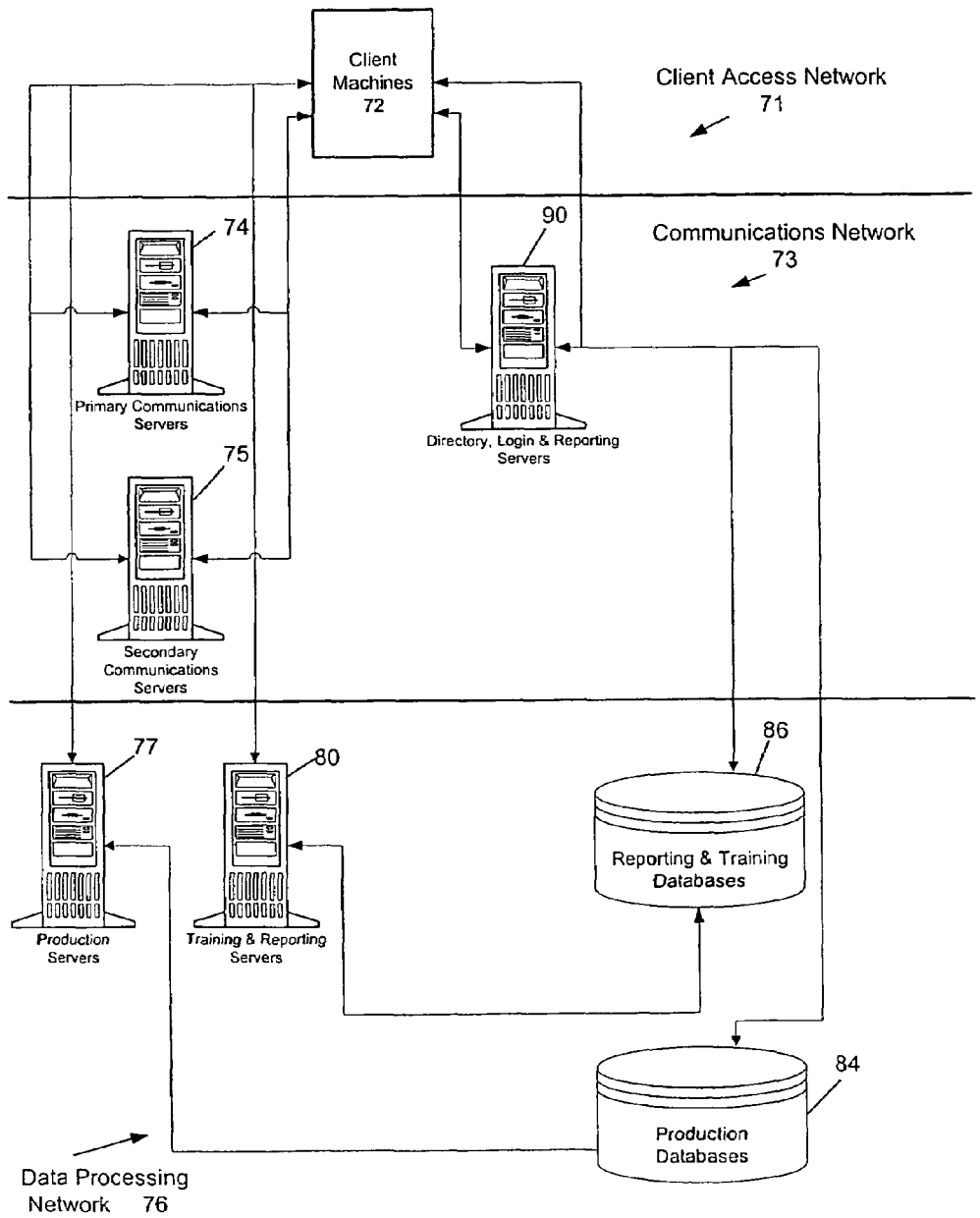
FIG. 4 is a schematic illustration of an embodiment of an auction network.

FIG. 4 is a diagram illustrating an auction network 70 of the present invention for operating an auction, and into which the server component 23 and the client component 31 may be incorporated. The auction network 70 may be divided into three functional sections: a client access network 71, a communications network 73, and a data processing network 76. The client access network 71 may, for example, include one or more client machines 72 for accessing and communicating with the communications network 73. The communications network 73 may include one or more primary communications servers 74, secondary communications servers 75, and directory, login and reporting servers 90. The data processing network 76 may include production servers 77, training and reporting servers 80, reporting and training databases 86, and production databases 84. The production servers 77 and training and reporting servers 80 are referred to collectively herein as bid servers 77 and 80. In one embodiment, the entities constituting the communications network 73 and the data processing network 76 may reside at the auction coordinator site and may be part of the auction coordinator's computer system 20.

The client machines 72 may be, for example, personal computers and may be located at each bidder 12-16 and purchaser site 10 (e.g., when the purchaser is not the same as the auction coordinator 20) for accessing the auction. The client machines 72 may access the auction by, for example, connecting to a web site operated by the party hosting the auction. The client machines 72 may also receive software from the communications network 73 that allows the client machines 72 to communicate with the communications network 73. Each client machine may have a configuration that includes at least a processor that executes applicable software, and a data storage device that stores applicable software and other auction data. One exemplary configuration for a client machine 12 is shown in FIG. 3.

The primary communications servers 74 are utilized to provide information about bids received from the client machines 72 to the bid servers 77 and 80, and to provide other bid information from the bid servers 77 and 80 to the client machines 72. The primary communications servers 74 may furthermore act as a firewall to prevent direct access to the bid servers 77 and 80 by the client machines. The secondary communications servers 75 act as backups to the primary communications servers 74. The secondary communications servers 75 will perform the communication functions normally performed by the primary communications servers 74 if a failure occurs in the primary communications servers 74, thereby providing redundancy to the auction network 70.

The directory, login, and reporting servers 90 may perform a variety of functions that may include a single server or include separate servers for the various functions. The directory, login, and reporting servers 90 may include a web server (not shown) that acts as a portal for access to the auction network 70. As such, the directory, login, and reporting servers 90 will receive login requests (from client machines 72) for access to the auction network 70 via, for example, the Internet. The directory, login, and reporting servers 90 may make access decisions as to whether a client machine 72 is permitted to access the communications network 73. If access is permitted, the directory, login, and reporting servers 90 will direct the client machine 72 to the appropriate portion of the auction network 70. The directory, login, and reporting servers 90, may provide reports to client machines 72. For example, information from prior auctions may be utilized by purchaser 10 to make a decision as to which bidder 12-16 will be awarded the sale and to permit the purchaser 10 to consider the way in which the auction proceeded so that future auctions may be refined.

Figure 5:
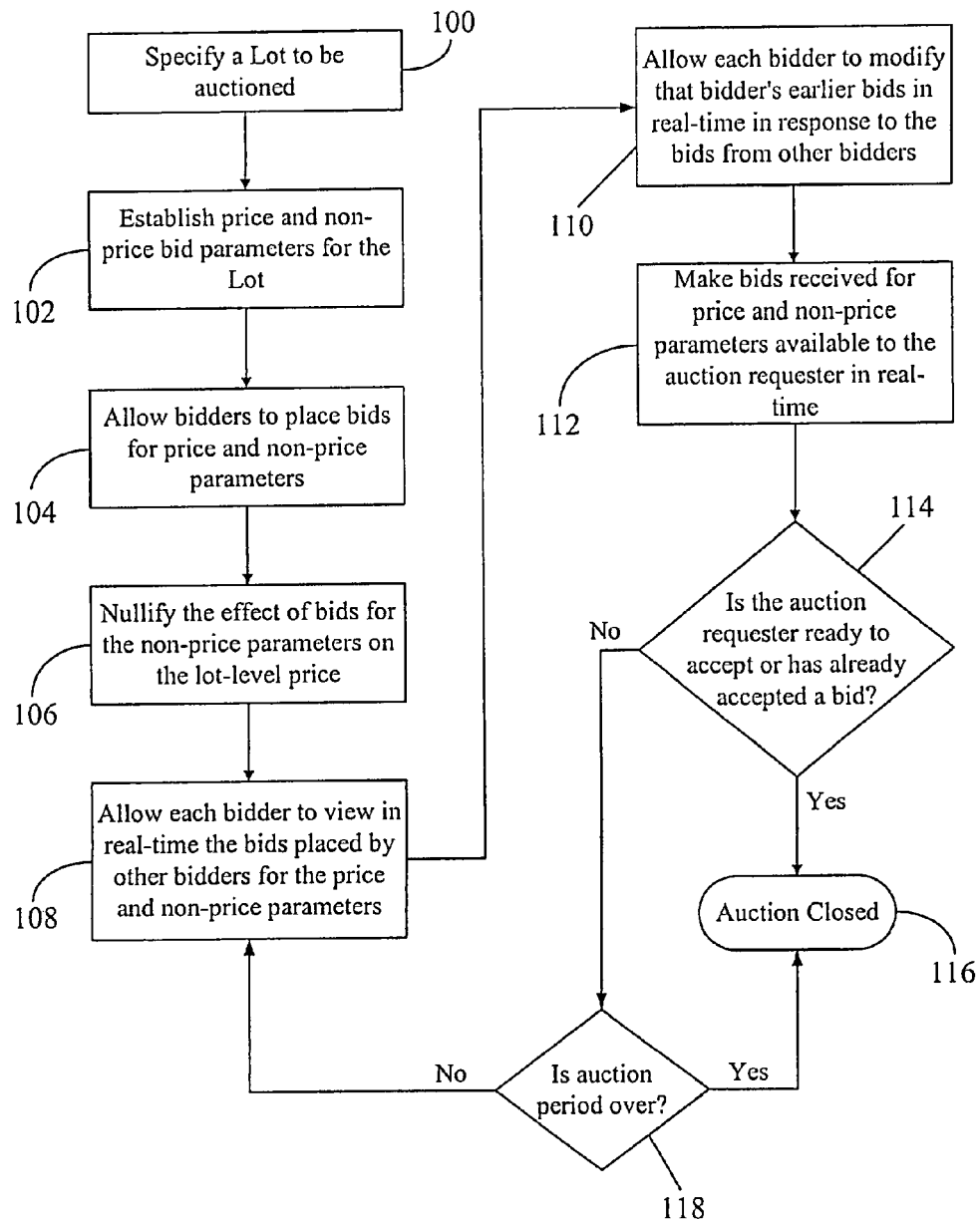
FIG. 5 is a flowchart illustrating an embodiment of an auction employing the multi-parameter optimal bidding process in accordance with the present invention.

The production servers 77 run the bidding software that facilitates the auction process such as, for example, the software whose functionality is illustrated through the flowchart in FIG. 5. The bidding software may be initially stored on an external storage medium (not shown) (e.g., a compact disc (CD), a digital versatile disc (DVD), a magnetic cartridge tape, or any other suitable magnetic or optical storage medium) or on an internal storage medium (e.g., the storage 25 in FIG. 3) and then downloaded/executed onto appropriate production servers 77 during the auction event. The production servers 77 may communicate with client machines 72 through primary and secondary communications servers 74 and 75. The production servers 77 may also be redundant so that if a failure occurs in the production server 77 that is being utilized in an auction event, the redundant backup production server (not shown) may perform the functions of the failed production server 77 and, thus, prevent failure of the auction.

The training and reporting servers 80 operate in a manner similar to the production servers 77 and provide reports for auctions. It is useful to operate test auctions to test the operating systems and to train personnel and clients. Such testing may be performed on the production servers 77 or, to prevent any degradation of system operation in actual auctions, one or more separate training servers (e.g., the servers 80) may be utilized for testing and training. Reporting may also be accomplished on the production servers 77 or the report creation functions may be offloaded to one or more reporting servers 80. The reporting servers 80 may furthermore be combined with the training servers 80.

Each server 74, 75, 77, 80, and 90 may have a processor (e.g.; the processor 21 in FIG. 3) that executes applicable software (e.g., the bidding software), and a data storage device (e.g., the storage device 25 in FIG. 3) that stores applicable software and data. It should be noted that, although the present invention is described in terms of a server component 23 (FIG. 3) and a client component 31 (FIG. 3), one skilled in the art will understand that the present invention is not limited to a client/server program relationship model, and may be implemented in a peer-to-peer communications model or any other model known to those skilled in the art. Data related to auctions may also be stored in the appropriate data storage device. The data storage device may include, either individually or in combination, for example, a magnetic storage device, a random access memory device (RAM), or a read only memory device (ROM). The auction-related data may include pre-auction data, post auction data, and data that is related to active auctions. Pre-auction data may include, for example, suppliers 12-16 that are permitted to bid on a particular auction and the scheduled auction starting and ending times. Post auction data may include the bids and bid times received in a particular auction and reports displaying that data in user friendly formats (discussed hereinbelow with reference to FIGS. 6-8). Active auction data may include data received from the bidders 12-16 as the auction is taking place and related data such as the rank of each bidder, real-time bid history for a bidder, real-time comparative analysis of bids from different bidders, etc.

The "rank" of the bidders 12-16 is generally determined by comparing, in real-time, the lowest amount bid by each bidder 12-16 and ordering the bidders 12-16 according to those lowest bids. The bidder who is ranked first is the bidder that has bid an amount lower than any other bidder in a reverse auction. The last rank may be a rank equal to the number of bidders who have submitted bids in the auction. In the case of tie bids between bidders, the last rank may be a rank equal to the number of unique bids by each bidder. In a reverse auction based on price only, the bidder having that last rank is the bidder that has submitted the highest amount.

Of course, there are many known ways to calculate the rank, and any of those may be used in connection with the subject invention, and are intended to be within the scope of the present invention. In a reverse auction, the bidders 12-16 are generally ranked between first and last according to the amounts of their lowest submitted bids at any given time. Thus, a higher, or better ranked bidder (e.g., the bidder 14 in FIG. 1C) in a reverse auction is a bidder who has placed a comparatively lower bid, while a higher, or better ranked bidder in a forward auction is a bidder who has placed a comparatively higher bid.

An auction may alternately be based on one or more factors other than price, such as quality, delivery factors (e.g., labor rate, lead time), and/or other factors (e.g., contract length) that are referred to herein collectively as "total value." Thus, rank may also be based on factors other than price, including total value and any other factor that is useful in an auction setting. A bid or bid amount is a value that is submitted by each participating bidder 12-16 for comparison to the bids of other bidders, and may likewise be based on a variety of bid factors that are considered important to the bid participants. Those factors may include, for example, price, quality, other costs such as delivery costs, labor rate, project lead time, contract length, or a total value. Bids may also be placed in a number of ways including, for example, absolute total value, or comparative value such as bidding in relation to an index price.

Three databases, or groupings of databases, are incorporated into the auction network illustrated in FIG. 4. The production databases 84 hold data that will be used by or is received from the production servers 77, while the reporting and training databases 86 hold data that will be used by or is received from the training and reporting servers 80.

The directory, login, and reporting servers 90 may provide a web portal for the client machines 72. The directory, login, and reporting servers 90 provide an initial contact point for the client machines 72, access to auctions in which the client machine 72 is permitted to participate, and reports relating to active and closed auctions.

One skilled in the art will recognize that certain components of the network described herein, while beneficial to an auction network, are not necessary components in an operational auction network. For example, the secondary communications servers 75 could be removed where the benefit of redundancy is not desired, and the primary communications servers 74 could be removed and the client machines 72 could communicate directly with the bid servers 77 and 80.

FIG. 5 shows a flowchart illustrating an embodiment of an auction employing the multi-parameter optimal bidding process in accordance with the present invention. The flowchart in FIG. 5 also illustrates the functionality supported by the bidding software according to the present invention. At the beginning of the auction process (block 100), the auction requester 10 specifies one or more lots to be auctioned. The auction coordinator 20, if any, receives a notification (e.g., through an e-mail or a regular mail) from the buyer 10 informing the coordinator about the lots to be auctioned. The coordinator 20, with appropriate input from the buyer 10, establishes price and non-price bid parameters for each lot to be auctioned (block 102). It is noted that the function of establishing price and non-price bid parameters may be performed automatically with the help of the coordinator's computer 20 and appropriate electronic inputs from the buyer 10. For example, the buyer 10 may specify a range of bid parameters the buyer wishes to consider in selecting the winning bidder. The coordinator's computer 20 may be programmed to electronically (e.g., via e-mail) receive such information and prepare a set of non-price bid parameters for the auction.

In the discussion given hereinbelow, the term "price parameter" is used interchangeably and synonymously with the term "price" to indicate the bid price (e.g., a dollar value) for each line item in the lot on auction. On the other hand, the term "non-price parameter" is used to include one or more of the following parameters (for example) that a bidder can place a bid for: lead time, labor rate, and contract length. It is noted that the prime bid parameter may still be the price or cost of each line item in the lot on auction. However, as discussed hereinbelow, other non-price bid parameters may be used to request bids for and to generate auction competition among the bidders, thereby benefiting the buyer to obtain the optimal bid for each lot on auction.

After the non-price parameters are determined, the qualified bidders 12-16 are notified (preferably via an e-mail) of the start and finish times for the auction. However, as discussed later hereinbelow, the auction may terminate earlier than its intended finish time if the buyer 10 instructs so or if the auction coordinator 20 notices illegal actions or irregularities from one or more bidders during the auction. A bidder may be disqualified for any irregularities and blocked from participating in the current as well as future auctions. In that case, the auction may continue, but without the disqualified bidder. On the other hand, an auction may be extended beyond its scheduled finish time if a bidder has requested such an extension or to accommodate bids received after the official finish time for the auction.

Once the auction commences, each bidder 12-16 may place as many bids as the bidder desires for the price and non-price bid parameters (block 104). In one embodiment, the auction coordinator 20 or the buyer 10 may specify a ceiling or upper limit for the number of bids that may be received from each bidder 12-16 for each lot or each line item in a lot or each price/non-price bid parameter. Such a ceiling may be programmed into the server module of the CBE software 26 to effectively and automatically monitor the number of bids placed by each bidder 12-16. In an alternative embodiment, a ceiling may also be specified for the percentage reduction in price/non-price parameter bid values that a bidder can submit as part of the bidder's next bid.

The client module of the CBE communication software 37 (FIG. 3) on a bidder's computer terminal may provide the necessary communication tool for the bidder to transmit its bids to the bid servers 77, 80. In one embodiment, the bidder may be required to access a pre-designated web site where an auction data entry form or web page may be presented to the bidder to enter that bidder's bid data therein. Alternatively, the data entry form or page may be included as part of the client module of the CBE communication software 37 and may be locally displayed on the bidder's computer terminal without requiring the bidder to access a remote web site. The data entry form displays fields for price and non-price bid parameters where the bidder can enter the bidder's bid using a data entry device such as, for example, a computer keyboard. As an example, the real-time computer screen display shown in FIG. 6 may also serve as a data entry page for the bidder to enter its bid data for different bid parameters. As noted earlier, a lot on auction may include line items and, hence, a bidder can submit its bids per line item as well.

The production servers 77 receive the bids placed by the bidders 12-16 and forward the received bid data to the bidding software running on the production servers 77. Initially, the bidding software acts to nullify the effect of bids for the non-price parameters on the lot-level price of a lot (block 106). As part of this nullification operation, the bidding software multiplies, in real-time, each bid value received from each bidder 12-16 for each non-price parameter by zero (0). This operation is carried out for each non-price parameter that has received a bid whether at the line item level or at the lot level. Because of this nullification, any automatic changes to a bid (by a bidder) will change the bid value for the corresponding price parameters only, and will not affect the values bid earlier for the non-price parameters.

The aggregate or total value for a bidder's bid (on one or more line items or lots) may be computed by a linear combination of each bid received from that bidder. The linear combination may be expressed as equation (1) given below:

$$\text{Total Bid} = a^*(\text{bid received for the price parameter}) + b_1^*(\text{bid received for the non-price parameter}_1) + b_2^*(\text{bid received for the non-price parameter}_2) + b_3^*(\text{bid received for the non-price parameter}_3) + \quad (1)$$

Here, the bidding software assigns zero (0) value to each of the weight parameters $b_1$, $b_2$, $b_3$, and so on. However, the value for the weight parameter "a" may either be selected as "1" or any other weight recommended by the buyer 10 based on a number of factors including, for example, the reputation of the bidder, the quality of the goods or services to be supplied by the bidder, experience with the bidder through prior commercial dealings, etc. In a preferred embodiment, the value for the weight "a" is selected as "1" to obtain objective price quote for the buyer 10 without indulging in bidder evaluation based oil subjective criteria. In that embodiment, the value for the Total Bid (equation-1) from a bidder is equal to the value of the price parameter only, because of the zero-multiplication carried out for bid values received for non-price parameters.

Figure 6:
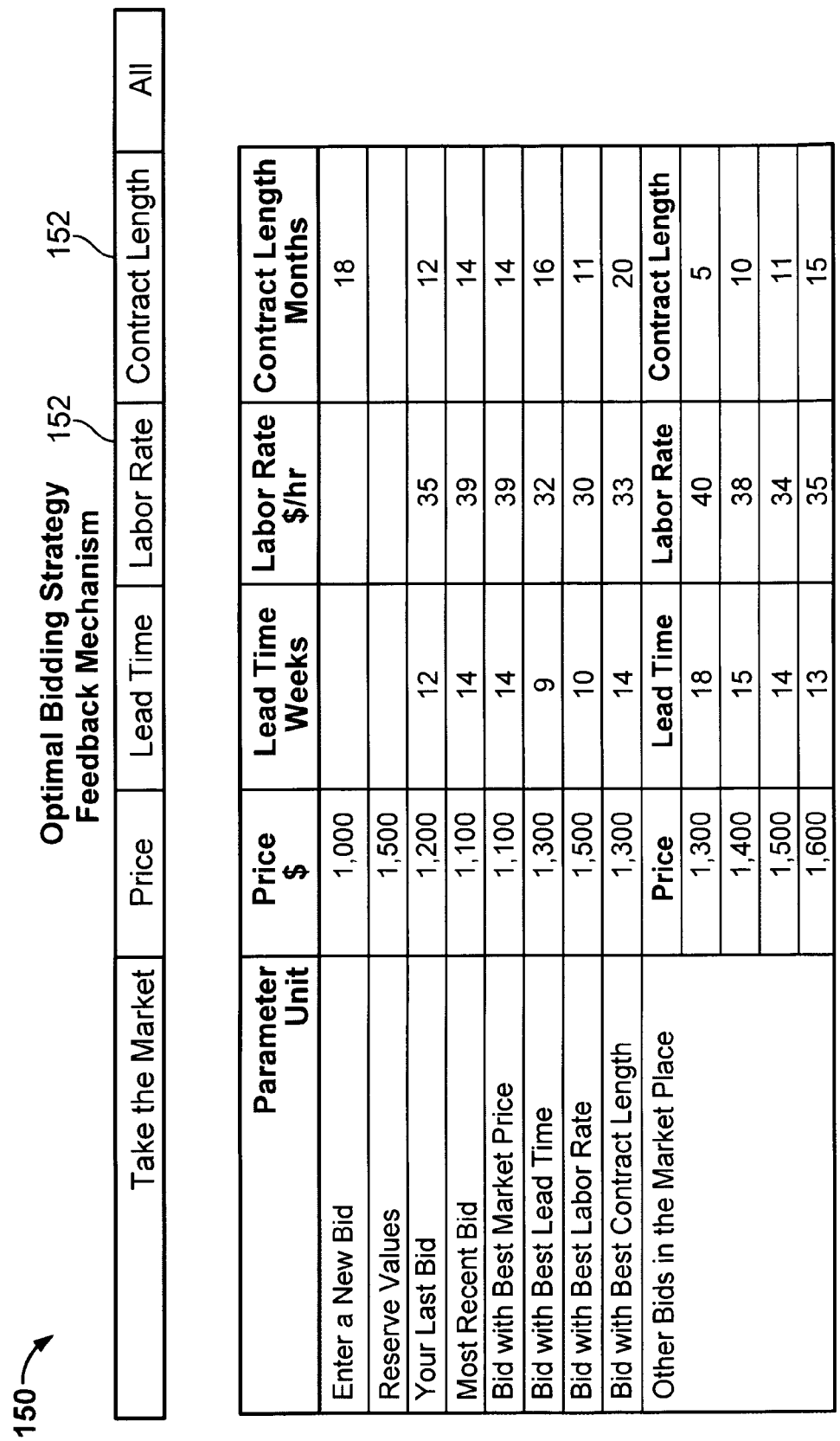
FIG. 6 is an exemplary bidder-specific computer screen display appearing in real-time on a computer terminal for a bidder participating in an electronic auction conducted in accordance with the present invention.

The bidding software is also configured to allow each bidder 12-16 to view, in real-time, the bids placed by other bidders for the price and non-price parameters (block 108). FIG. 6 is an exemplary bidder-specific computer screen display 150 appearing in real-time on a computer terminal for a bidder 12-16 participating in an electronic auction conducted in accordance with the present invention. The computer screen display 150 may be generated by the bidding software and sent to the CBE communication software 37 at the respective bidder's computer terminal to be displayed on the bidder's computer monitor. Alternatively, the CBE communication software 37 may locally maintain the format for the computer screen display 150, and the bidding software then provides the field headings (e.g., Price, Lead Time, etc.) and data values for each field appearing on the display 150. The computer screen display 150 shows the bidder-specific information including, for example, that bidder's most recent bid, other relevant bids in the market place, the bid with the best value for the price parameter, etc. Such a comprehensive feedback in real-time allows a bidder 12-16 to effectively monitor the auction marketplace and to change/modify its bid to maintain its competitiveness in the auction marketplace. The viewer (i.e., the bidder) may select to view bid data for all the bid parameters or may "deselect" one or more bid parameters (by clicking on the appropriate "button" 152 for the field to be deselected) so that the display 150 does not show bid data for that deselected field. The bidder 12-16 may select the deselected field by again clicking on the appropriate button 152.

The bidding software may update values appearing in various fields of the computer screen display 150 in real-time so as to provide the most up-to-date bidding information to each bidder 12-16. As shown in FIG. 6, the screen display 150 contains data entry fields for price and non-price parameters where a bidder can enter new values in view of the changing market conditions. Thus, the bidding software, in conjunction with the CBE communication software 37 on the bidder's computer, allows each bidder to modify that bidder's earlier bids (for price and non-price parameters) in real-time (block 110 in FIG. 5). The bidder 12-16 may enter the new bids for each displayed bid parameter and the CBE communication software 37 may transmit the new bid data in real-time to the bidding software, which, in turn, may make the newly-received updated bid data available to other bidders in the auction marketplace.

As noted hereinbefore, the bid values for non-price parameters are zero-weighted so as to nullify their effect on the lot-level price. In addition to zero-weighting, the bidding software "locks" the bid values initially received (i.e., the values first received at the commencement of the auction) for non-price parameters, but keeps the values received for the price parameter as "unlocked." In other words, whenever a bidder 12-16 changes the value it had bid before for the lot on auction, that changed value is applied to the price parameter only. Thus, the values bid for the non-price parameter remain unchanged whenever bids are automatically changed or whenever the bidder enters a new bid value. Because of the fixing of the values initially bid for the non-price parameters and keeping the price parameter field flexible, the bidder has to actively "unlock" the non-price parameter fields to effect a bid change. One advantage of maintaining the non-price parameter fields as "fixed" is that it helps the buyer 10 obtain the optimum bid on the buyer's lot on auction. A bidder reducing the bid price for the lot (in response to the downward bidding in the auction marketplace) may not necessarily want to raise its bid values for non-price parameters in exchange. Further, a reduced value for the price parameter does not necessarily mean that the values for the non-price parameters also have to either increase or decrease in lockstep. Therefore, locking the initial bid values for the non-price parameters helps the buyer 10 push the bidding to the optimum values for the combination of price and non-price parameters.

Figure 7:
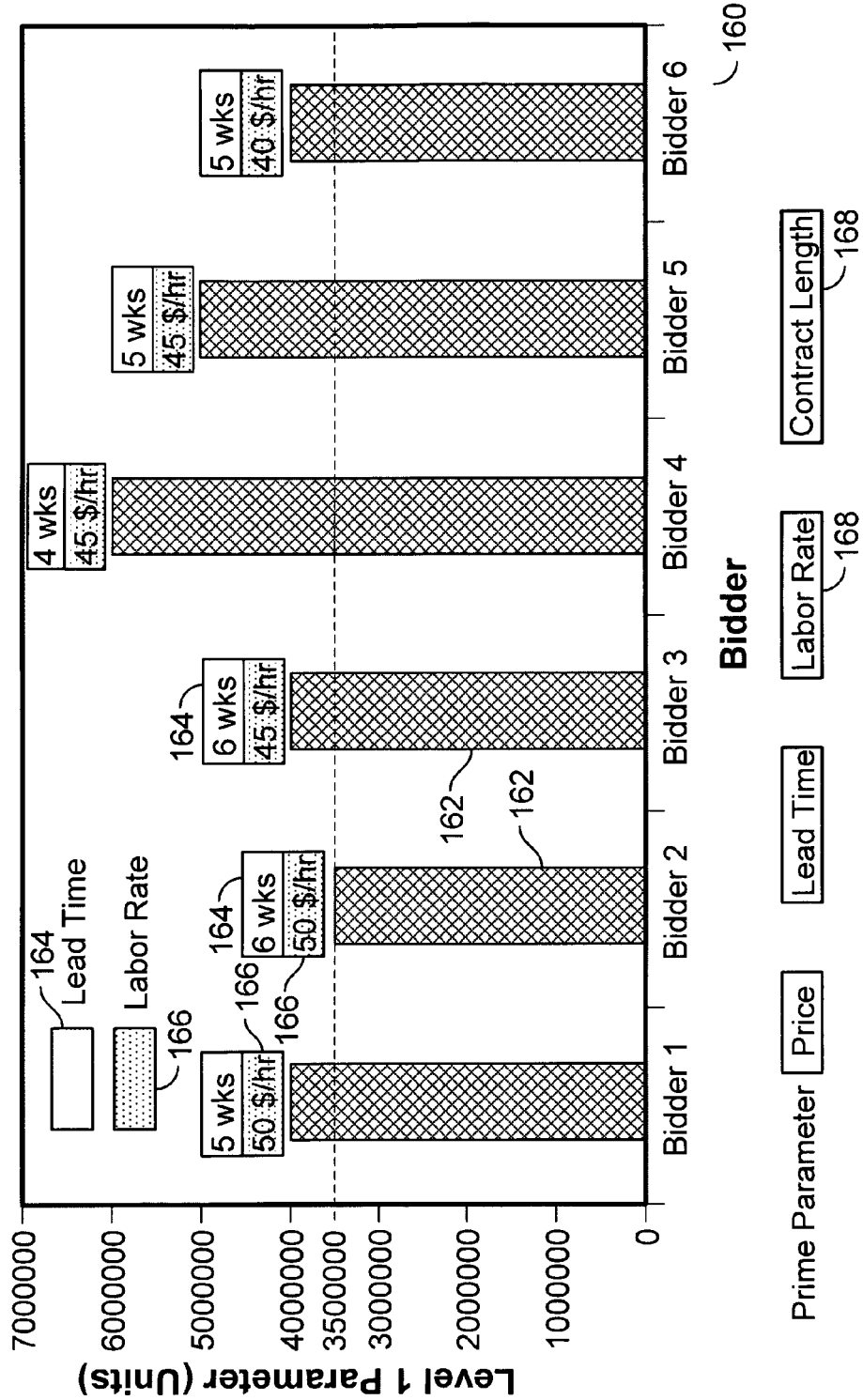
FIG. 7 shows an exemplary graphical representation appearing on a computer terminal for a bidder showing real-time details of various bids received for multiple bid parameters.

In addition to the spreadsheet-style bid data display (such as, for example, the display shown in FIG. 6), the bidding software may be configured to generate and transmit comparative bidding history in a graphical format to each bidder 12-16 in the auction marketplace. FIG. 7 shows an exemplary graphical representation 160 appearing on a computer terminal for a bidder 12-16 showing real-time details of various bids received for multiple bid parameters. FIG. 7 shows real-time bidding history for six bidders, but only three of them 12, 14, 16 are shown and described herein. The multi-parameter bid graph 160 in FIG. 7 depicts each bidder's performance on three parameters: (1) price, (2) lead time, and (3) labor rate. However, it is evident that values for more than three parameters or any other additional or substitute bid parameter (e.g., bidder-specific values for contract length) may also be displayed as part of the bar graph 160 in FIG. 7 or with any other suitable graphical representation. The purpose of the bid graph 160 in FIG. 7 is to inform each bidder where that bidder stands relative to the competition in the auction marketplace. For each bidder, the vertical bar 162 represents the value that bidder has bid for the price parameter for the respective line item or the entire lot. As noted hereinabove, such a value may be conveyed by the "total" or "aggregate" bid parameter given by equation (1). In addition to the bids on the price of the goods or services on auction, the bar graph 160 in FIG. 7 also shows, in real-time, the bidder-specific values for two other (non-price) parameters: the lead time, and the labor rate. The values bid by each bidder for the "lead time" parameter are represented by the reference numeral 164 and the values bid by each bidder for the "labor rate" parameter are represented by the reference numeral 166. The bidding software may update the graphs in real-time, i.e., whenever there is a change (upward or downward) in one or more values shown in the last bid graph 160.

In one embodiment, the viewer viewing the bid graph 160 may be allowed to select which parameter the viewer wishes to have represented by the vertical bars 162. For example, the viewer may select or "click" on the "buttons" 168 appearing at the bottom of the bid graph 160 to select an appropriate parameter that can be represented as a prime parameter (i.e., the parameter whose values are displayed through vertical bars 162). The CBE communication software 37 on the viewer's (or bidder's) computer terminal may receive the viewer's selection and then redraw the bid graph with the selected parameter as the prime parameter. The other parameters may then be displayed through box values as shown by the blocks 164 and 166. Thus, the viewer can view the desired parameter in the vertical bar format.

In addition to sending real-time bid history to bidders' computer terminals 12-16 and thereby allowing each bidder 12-16 to monitor the auction marketplace in real-time, the bidding software may also be configured to send the real-time bidding data to the buyer 10 (block 112). In that case, in addition to the post-auction data, the bidding software may transmit the active auction data (including data conveying real-time bid history) to the buyer's computer terminal 10 so that the buyer 10 can also monitor the auction marketplace activities. The active auction data sent to the buyer's computer terminal 10 may include bid values received for the price and non-price parameters from each bidder 12-16. In one embodiment, a bid graph similar to the bid graph 160 illustrated in FIG. 7 may be displayed on the buyer's computer terminal 10 in real-time so that the buyer 10 can stay informed about the activities on the electronic "bidding floor." In another embodiment, a spread-sheet style data table (similar in style to that illustrated in FIG. 6) may be displayed for the buyer 10 showing, in real-time, bids received from each bidder 12-16 for each price and non-price parameter.

Figure 8:
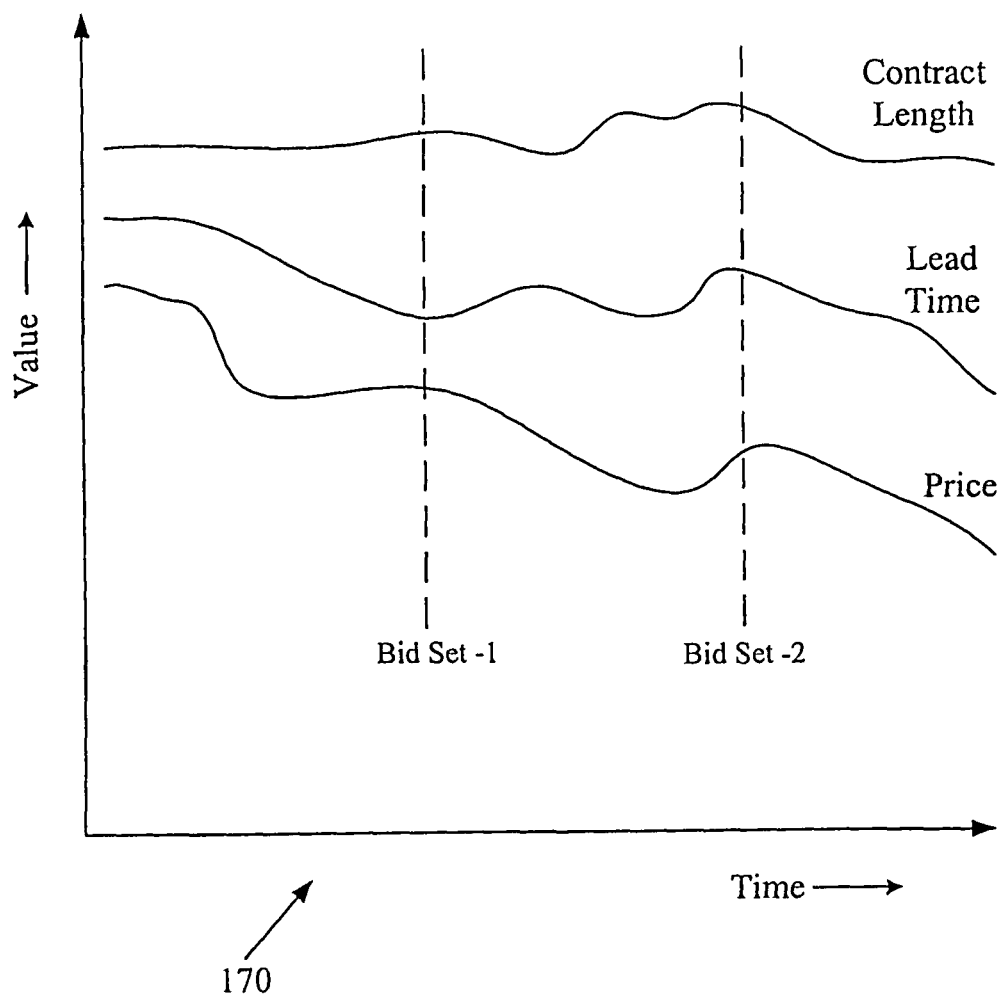
FIG. 8 illustrates an exemplary graphical representation of the multi-parameter bidding activity during an online auction.

In an alternative embodiment, a real-time graphical representation of the bidding activity may also be displayed on the buyer's computer terminal 10 with the help of the bidding software and the CBE communication software 37 resident on the buyer's computer 10. In the absence of the CBE communication software 37, the buyer 10 may alternatively access a remote, pre-designated web site (as noted hereinbefore) and view the real-time display of bid values. The real-time graphical representation may plot against the time-axis, the continuous flow of values received by the bidding software from various bidders 12-16 as they place bids for the pre-defined set of price and non-price parameters. FIG. 8 illustrates an exemplary graphical representation 170 of the multi-parameter bidding activity during an online auction. The graphs shown in FIG. 8 are plotted continuously against time (on the x-axis) until the auction is closed. Such a representation also allows the buyer 10 to monitor the auction marketplace activities in real-time.

As can be seen from the graphs in FIG. 8, it may not always be the case that the bid value for the price parameter continuously goes down over time. In a multi-parameter bidding situation, it may happen that a bidder 12-16 may decide to quote more price for a line item or the lot in exchange for reduced quotes for other non-price parameters (e.g., the set of bids referred to as bid set-1 in FIG. 8). On the other hand, a bidder may quote more for price as well as non-price parameters than it had bid before (e.g., the bid set-2). The bidding software merely displays all bid values (for price and non-price parameters) as they are received in real-time. It is up to the buyer 10 to determine how much weight to be given to a specific combination of bid values for price and non-price parameters. The buyer may select a bidder who has quoted the lowest value for the lead time, even though that bidder may not have quoted the lowest value for the price of the item on auction. The bidding software thus does not assign any weights to the received bid values. It merely reports the values to the buyer who ultimately selects the winning bidder.

Referring back to FIG. 5, the auction may close (block 116) if the buyer 10 is ready to accept a bidder's set of bids (block 114) or if the predetermined auction period concludes (block 118). Normally the buyer or the auction requester 10 may keep the auction open until the auction period is officially over. However, in some situations, the buyer 10 may decide to accept a specific bidder's bid proposal prior to the official auction closing time (if the auction agreement allows so) and notify other bidders that the buyer 10 has closed the auction. After the auction closes (block 116), the buyer 10 may invite the winning bidder (e.g., the bidder 14 as shown in FIG. 1C) to enter into a contract with the buyer 10 as required by the terms of the auction. Instead of a single winning bidder, the buyer 10 may select a group of bidders as winning bidders and may distribute the auction contract work among the selected bidders. Alternatively, the buyer 10 may select a winning bidder per line item on auction.

It is noted that an on-line auction conducted in accordance with the teachings of the present invention and with two variable parameters (price and lead time) resulted in 25.3% ($1.22 million) savings for the buyer on one commodity alone. In addition, the lead times for the winning bidder were reduced by 18% (7 weeks).

The foregoing describes an auction methodology wherein the auction competition among the bidders is generated by allowing each bidder to bid for non-price bid parameters (such as, for example, lead time, labor rate, contract length, etc.) in addition to the traditional bidding for the price of the item/lot on auction. Such a multi-parameter bidding provides the buyer (i.e., the auction requester) with more diverse information when selecting the winning bidder and, hence, allows the buyer to receive an optimal bid for the buyer's item on auction. The buyer and each bidder participating in the electronic auction may receive a real-time feedback of the bidding activity in the electronic auction marketplace. The buyer receives information in real-time about bids placed by each bidder for the price and non-price parameters. Each bidder receiving the real-time feedback about what other bidders are bidding may adjust or modify one or more of its own bids (for price and non-price bid parameters) to effectively compete in the auction.

To generate the optimal bid for the buyer, the bidding software according to the present invention nullifies the effect of each bidder's bids for the non-price parameters on that bidder's bid for the price parameter by multiplying the value of the bid for each non-price parameter by the number zero (0) and also locks the bid values initially received for the non-price parameters to avoid affecting their values when lot price is changed during bidding. Because of zero-weighting, the total bid value remains equal to the bid value for the price parameter only. Because of locking of initial values for the non-price parameters, any automatic changes (by a bidder) to a bid results in a change in the bid value for the price parameter only. As the buyer primarily considers the bids received for the price of the item on auction in determining who to select as the winning bidder, such zero-weighting and locking helps the buyer objectively determine the optimal bid for the item on auction.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing (reverse) auctions, the auction functions can be equally applied to upward pricing (forward) auctions. Thus, it is intended that the present invention cover the modifications and variations of this invention provided they come within the scope of the appended claims and their equivalents.

What is claimed is:

1. A method of conducting an auction among a plurality of bidders, comprising:
   allowing each bidder to place a first respective bid for each of a plurality of bid parameters established for a lot, wherein said plurality of bid parameters includes a price parameter and at least one non-price parameter;
   locking, using a processor, the at least one non-price parameter such that a second respective bid placed after the first respective bid or changes to the first respective bid modifies the price parameter but does not modify the at least one non-price parameter; and
   making bids received for said price and said non-price parameters available to an auction requester in real-time.

2. The method of claim 1, further comprising: for each said bidder, generating a total bid for said lot by combining all bids placed by each said bidder, wherein said total bid equals in value to the bid for said price parameter placed by the corresponding bidder.

3. The method of claim 1, wherein allowing each said bidder to place said respective first bid includes performing the following in real-time:
   displaying a data entry page on a corresponding bidder computer terminal accessible to respective one of said plurality of bidders, wherein said data entry page includes a data entry field for each of said plurality of bid parameters; and
   allowing each said bidder to access said data entry page and place said respective first bid for each of said plurality of bid parameters by entering said respective bid in said data entry field for corresponding bid parameter.

4. The method of claim 3, wherein displaying said data entry page includes:
   executing an auction software at a remote computer connected to each said bidder computer terminal via a communication network, wherein said auction software, upon execution, generates said data entry page; and
   sending said data entry page generated upon execution of said auction software over said communication network to respective bidder computer terminals to be displayed thereon.

5. The method of claim 3, wherein said data entry page is displayed by executing an auction software resident on each said bidder computer terminal, wherein said auction software, upon execution, generates said data entry page.

6. The method of claim 2, wherein generating said total bid for each said bidder includes performing the following in real-time for each said bidder:
   multiplying each bid received for a corresponding on-price parameter by zero and aggregating all zero-multiplied bids, thereby generating a null value; and
   combining said null value with said respective bid for said price to generate said total bid.

7. The method of claim 2, further comprising making said total bid by each corresponding bidder available to said auction requester in real-time.

8. A system for conducting an auction among a plurality of bidders, comprising:
   a processor configured to:
      allow each bidder to place a first respective bid for each of a plurality of bid parameters established for a lot, wherein said plurality of bid parameters includes a price parameter and at least one non-price parameter;
      lock the at least one non-price parameter such that a second respective bid placed after the first respective bid or changes to the first respective bid modifies the price parameter but does not modify the at least one non-price parameter; and
      make bids received for said price and said non-price parameters available to an auction requester in real-time; and
   a memory configured to provide the processor with instructions.

9. The system of claim 8, wherein the processor is further configured to: for each said bidder, generate a total bid for said lot by combining all bids placed by each said bidder, wherein said total bid equals in value to the bid for said price parameter placed by the corresponding bidder.

10. The system of claim 8, wherein allowing each said bidder to place said respective first bid includes performing the following in real-time:
   displaying a data entry page on a corresponding bidder computer terminal accessible to respective one of said plurality of bidders, wherein said data entry page includes a data entry field for each of said plurality of bid parameters; and allowing each said bidder to access said data entry page and place said respective bid for each of said plurality of bid parameters by entering said respective bid in said data entry field for corresponding bid parameter.

11. The system of claim 10, wherein displaying said data entry page includes:
   executing an auction software at a remote computer connected to each said bidder computer terminal via a communication network, wherein said auction software, upon execution, generates said data entry page; and
   sending said data entry page generated upon execution of said auction software over said communication network to respective bidder computer terminals to be displayed thereon.

12. The system of claim 10, wherein said data entry page is displayed by executing an auction software resident on each said bidder computer terminal, wherein said auction software, upon execution, generates said data entry page.

13. The system of claim 9, wherein generating said total bid for each said bidder includes performing the following in real-time for each said bidder:
   multiplying each bid received for a corresponding on-price parameter by zero and aggregating all zero-multiplied bids, thereby generating a null value; and
   combining said null value with said respective bid for said price to generate said total bid.

14. The system of claim 9, wherein the processor is further configured to make said total bid by each corresponding bidder available to said auction requester in real-time.

15. A computer program product for conducting an auction among a plurality of bidders, the computer program product being embodied in a tangible non-transitory computer readable storage medium and comprising computer instructions for:
   allowing each bidder to place a first respective bid for each of a plurality of bid parameters established for a lot, wherein said plurality of bid parameters includes a price parameter and at least one non-price parameter;
   locking, using a processor, the at least one non-price parameter such that a second respective bid placed after the first respective bid or changes to the first respective bid modifies the price parameter but does not modify the at least one non-price parameter; and
   making bids received for said price and said non-price parameters available to an auction requester.

* * * * *

UNITED STATES PATENT AND TRADEMARK OFFICE
CERTIFICATE OF CORRECTION

| | | |
|---|---|---|
| PATENT NO. | : 8,725,622 B2 | Page 1 of 1 |
| APPLICATION NO. | : 11/982339 | |
| DATED | : May 13, 2014 | |
| INVENTOR(S) | : Gujral et al. | |

It is certified that error appears in the above-identified patent and that said Letters Patent is hereby corrected as shown below:

Title page

Item (75) Inventors, "Tim Jackovic" should be -- Timothy J. Jackovic --.

Item (75) Inventors, "Dan V. Pedersen" should be -- Daniel V. Pedersen --.

Claims

In column 20, line 8, claim 15, after "embodied in a", delete "tangible".

Signed and Sealed this
Eighth Day of March, 2016

Michelle K. Lee
*Director of the United States Patent and Trademark Office*